United States Patent [19]
Tomko et al.

[11] Patent Number: 5,912,299
[45] Date of Patent: Jun. 15, 1999

[54] COATING COMPOSITIONS FROM OIL MODIFIED POLYURETHANE DISPERSIONS

[75] Inventors: Revathi R. Tomko, North Olmsted; Barbara J. Varone, Munroe Falls, both of Ohio

[73] Assignee: The Sherwin-Williams Company, Cleveland, Ohio

[21] Appl. No.: 08/474,292

[22] Filed: Jun. 7, 1995

[51] Int. Cl.⁶ .............................. C08L 75/02; C08L 75/04; C08G 18/30; C08G 18/10

[52] U.S. Cl. .......................... 524/840; 523/402; 523/415; 524/591; 524/839; 528/49; 528/71; 528/73; 528/74.5; 528/75; 528/76; 528/80; 528/85; 528/83; 528/84

[58] Field of Search ....................... 524/591, 839, 524/840; 528/49, 71, 73, 74.5, 75, 83, 76, 85, 80, 84; 523/402, 415

[56] References Cited

U.S. PATENT DOCUMENTS

| | | | |
|---|---|---|---|
| 3,758,427 | 9/1973 | Katsibas | 524/591 |
| 4,268,426 | 5/1981 | Williams et al. | 528/80 |
| 4,276,329 | 6/1981 | Vasishth et al. | 427/393 |
| 4,432,797 | 2/1984 | Vasishth et al. | 106/34 |
| 4,826,894 | 5/1989 | Markusch et al. | 523/415 |
| 4,925,885 | 5/1990 | Rosthauser et al. | 523/415 |
| 5,310,780 | 5/1994 | Tomko et al. | 524/591 |
| 5,354,807 | 10/1994 | Dochniak | 524/591 |
| 5,403,392 | 4/1995 | Craig | 106/162 |
| 5,512,655 | 4/1996 | Klauck et al. | 528/74.5 |

FOREIGN PATENT DOCUMENTS

| | | |
|---|---|---|
| 0314378 | 5/1989 | European Pat. Off. . |
| 1589605 | 5/1981 | United Kingdom . |
| 2215732 | 9/1989 | United Kingdom . |

*Primary Examiner*—Rabon Sergent
*Attorney, Agent, or Firm*—Heidi A. Boehlefeld; Robert E. McDonald; Vivien Y. Tsang

[57] ABSTRACT

Low VOC compositions for coating, staining and protecting porous substrates such as wood, concrete, cement, brick and the like, comprising aqueous dispersions of polyurethane-ureas.

20 Claims, No Drawings

COATING COMPOSITIONS FROM OIL MODIFIED POLYURETHANE DISPERSIONS

BACKGROUND OF THE INVENTION

The present invention relates to oil modified polyurethane-urea dispersions in water and coatings produced therefrom. The present invention represents an improvement in the area of polyurethane dispersion resins and an improvement in the coatings art. The improvement comprises the addition of a modifier composition selected from the group consisting of C6-C22 aliphatic chain-containing anhydride-functional fatty acids and oils, C6-C22 aliphatic chain containing epoxidized oils, and mixtures thereof, to an isocyanate-functional prepolymer. If used in the aqueous phase, the modifier composition is chemically attached to the prepolymer via the diamine chain extender. If used during the prepolymer cook, the modifier composition attaches to the prepolymer backbone via an active-hydrogen containing composition. The resultant polymer exhibits excellent water repellency due to the inclusion of the hydrophobic aliphatic end group. Introducing long hydrophobic end groups imparts excellent water resistance and beading characteristics, even to a low molecular weight dispersion polymer. Such low molecular weight polymers would otherwise be expected to show early water sensitivity.

The polymer is particularly useful as either a surface coating or as a penetrating finish on porous substrates such as wood, concrete, cement, brick and the like. Surface coatings can be very high molecular weight, can be highly crosslinked, and characteristically form a continuous film over the substrate. Varnishes and polyurethane clearcoats are typically classified as surface coatings.

Penetrating finishes, on the other hand, are designed to protect a substrate, and typically change a substrate's color, yet retain the natural textural appearance of the substrate. Penetrating pigmented stains, non-pigmented wood preservatives, and water sealants are typical examples of penetrating finishes. One key attribute of penetrating finishes is that they are designed so as not to form an appreciable surface film or coating on the wood/substrate. They are typically low in molecular weight and very small particle size. They are durable, well suited for textured, exposed surfaces such as siding, decks, steps and the like, can contain water repellants, and are easily applied.

This invention is directed to polyurethane dispersion resins and to both surface coatings and penetrating finishes containing such dispersions.

With the advent of environmental laws and regulations controlling the maximum amounts of VOC permitted in paints, coatings, stains, sealants and the like, numerous attempts have been made in the prior art to formulate coatings and stains which comply with the VOC requirements.

For example, European Patent Application 0 314 378 A1 to Adkins discloses a waterborne alkyd deck stain containing a medium-long oil length water-reducible alkyd resin solubilized in water with the use of propylene glycol tertiary butyl ether as a coupling solvent. Adkins claims to have low VOC, good resistance to water, durability to abrasion and the like.

Likewise, U.S. Pat. No. 4,276,329 to Vasishth et al. discloses a composition for treating and protecting wood surfaces comprising a low molecular weight alkyd resin in a cosolvent of water and glycol ether.

U.S. Pat. No. 4,432,797 to Vasishth et al. discloses a water based thickened stain containing a film forming resin, pigment, thickener and water. The resin is taught to be either an alkyd, a water based acrylic or a water solution of a modified polysaccharide polymer.

UK Patent Application 2 215 732 A to Timperley discloses a water based wood staining composition comprising a water soluble acrylic resin and a pigment.

UK Patent 1 589 605 to Gorivaerk disclose a method of preparing a penetrating wood stain of a suspension of finely divided solids in an oil-in-water emulsion.

U.S. Pat. No. 5,310,780 relates to previous work of one of the present inventors. The present invention represents a substantial improvement over the '780 patent. The improvement comprises the addition of a modifier composition selected from the group consisting of C6-C22 aliphatic chain-containing anhydride-functional fatty acids and oils, C6-C22 aliphatic chain containing epoxidized oils, and mixtures thereof, to an isocyanate-functional prepolymer. The modifier composition is either chemically attached to the prepolymer via the diamine chain extender or to the prepolymer backbone via an active-hydrogen containing prepolymer reactant, resulting in a polymer that exhibits excellent water repellency due to the inclusion of the hydrophobic aliphatic end group.

U.S. Pat. No. 5,354,807 to Dochniak discloses anionic water dispersed polyurethane polymers that comprise the reaction product of a polyisocyanate, an active-hydrogen containing compound such as a polyol and a diamine monomer containing a pendant aliphatic.

SUMMARY OF THE INVENTION

The present invention relates to low VOC, coating compositions for coating and/or staining and protecting porous surfaces such as wood, concrete, cement, brick and the like. In particular, this invention relates to stable dispersions of polyurethane-ureas in water which also comprise a long aliphatic chain that is attached to the isocyanate-functional prepolymer either via a diamine chain extender when dispersed in water or via an active-hydrogen containing prepolymer reactant. The dispersions of this invention are particularly useful as environmentally compliant coatings, penetrating stains and water sealants. The present invention relates to an improvement in the area of polyurethane dispersion resins and an improvement in the coatings art. The improvement comprises the addition of a modifier composition selected from the group consisting of C6-C22 aliphatic chain-containing anhydride-functional fatty acids and oils, C6-C22 aliphatic chain containing epoxidized oils, and mixtures thereof, to an isocyanate-functional prepolymer. The resultant polymer exhibits excellent water repellency due to the inclusion of the hydrophobic aliphatic end group.

The present invention relates to low VOC stable, small particle size dispersions of polyurethane-ureas in an aqueous solvent which are especially suitable as coatings, penetrating stains and water sealants. The dispersions of this invention have excellent abrasion resistance, shelf stability, penetration into porous surfaces and UV light stability. These dispersions are particularly suited for use, either alone or with additional ingredients such as pigments, waxes and the like, as surface coatings, penetrating stains and water sealants. The polyurethane-ureas of this invention are very low in molecular weight yet, due to the inclusion of the long hydrophobic group, are not water sensitive.

DETAILED DESCRIPTION OF THE INVENTION

The compositions of this invention are surface coatings, penetrating stains and water sealants which comprise low VOC, stable dispersions of small particle size polyurethane-ureas in an aqueous media. Preferably, the particle size of the polyurethane-urea molecules is less than about 0.4 micron, and most preferably in the range of about 0.1 to about 0.3 micron. The polyurethane-ureas are low in molecular weight. Prior to dispersion in water, the polyurethane-urea intermediates have a weight average molecular weight generally less than about 10,000. When dispersed in an aqueous media, the polyurethane-ureas have a theoretical free isocyanate functionality of zero and a weight average molecular weight generally less than about 50,000.

The compositions of this invention comprise the reaction product of an active-hydrogen containing composition with an isocyanate-functional material. Preferred are active-hydrogen containing compositions that are difunctional with respect to isocyanate groups although lower and higher functional active-hydrogen containing materials are also acceptable for inclusion herein. It should be appreciated that lower functional materials will cause the preparation of a lower molecular weight prepolymer whereas higher functional materials will cause the preparation of a higher molecular weight, crosslinked prepolymer. Selection of these materials should be made with the desired end use (i.e. surface coating versus penetrating stain/sealer) in mind. Materials having functionality greater than two can be used more readily in surface coatings whereas difunctional materials are preferred if preparing a penetrating stain or sealant. Primary concerns which factor into the selection of lower or higher functional materials are the viscosity of the resultant composition, the maintenance of lower VOC and the composition's ability to penetrate, if desired, into the substrate.

The active-hydrogen containing composition is preferably selected from the group consisting of diols such as 1) polyester diols formed from the reaction of saturated and unsaturated polyhydric alcohols such as ethylene glycol, propylene glycol, neopentyl glycol, 1,4-butanediol, 1,4-butenediol, 1,6-hexanediol, furan dimethanol, and cyclohexane dimethanol, with saturated and unsaturated polycarboxylic acids and derivatives thereof such as maleic acid, fumaric acid, itaconic acid, succinic acid, glutaric acid, adipic acid, isophthalic acid, terephthalic acid, phthalic anhydride, dimethyl terephthalate, dimer acids and the like;

2) polyesters formed by the reaction of lactones, such as caprolactone, with a diol;

3) polyether diols such as the products of the polymerization of a cyclic oxide such as ethylene oxide, propylene oxide or tetrahydrofuran;

4) polyether diols formed by the addition of one or more cyclic oxides to water, ethylene glycol, propylene glycol, diethylene glycol, cyclohexane dimethanol, glycerol, or Bisphenol A;

5) polycarbonate diols such as the reaction product of 1,3-propanediol, 1,4-butanediol, 1,6-hexanediol, diethylene glycol or tetraethylene glycol with diaryl carbonates such as diphenyl carbonate or phosgene;

6) polyacetal diols such as the reaction product of a glycol such as diethylene glycol, triethylene glycol or hexanediol with formaldehyde;

7) low molecular weight diols such as dihydroxyalkanoic acids including dimethylolpropionic acid;

and mixtures thereof. Other active hydrogen containing compositions are also suitable for use herein. For example, active hydrogens include hydrogen atoms attached to oxygen, nitrogen or sulfur, and thus, in addition to the polyols disclosed above, compounds such as diamines, aminoalcohols, and mercapto-terminated derivatives thereof, are also useful. Representative materials include the materials disclosed in U.S. Pat. No. 5,354,807 which is incorporated herein by reference.

The isocyanate-functional material is selected from the group of aromatic, cycloaliphatic or aliphatic isocyanates, preferably diisocyanate selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanates, Desmodur W™ (a 4,4'-dicyclohexylmethane diisocyanate available from Mobay), benzene 1,3-bis (1-isocyanato-1-methylethyl)[m-TMXDI], and mixtures thereof.

Optionally present during the formation of the prepolymer is an active-hydrogen containing composition that is monofunctional with respect to isocyanates and which contains a long aliphatic chain, preferably a C6 or greater aliphatic chain, more preferably a C12 to C22 aliphatic chain. If included, the amount of such material should be such that from about 1% to about 50% of the total active-hydrogen functionality is contributed by the monofunctional composition. Representative monofunctional compositions include the alcohols, mercaptans and monoamines having C6 or greater aliphatic chains such as C6-C22 alcohols, mercaptans and monoamines such as hexyl, soya, tallow, hydrogenated tallow, stearyl, coco, lauryl, and oleyl alcohol, mercaptan, amine, and mixtures thereof.

Optionally, and preferably present during the reaction is up to about 0.06%, preferably between about 0.01% and about 0.04% (by weight based upon total solids of active-hydrogen containing compositions and isocyanate) of a catalyst such as di-butyl tin dilaurate, tin octoate and the like.

During formation of the prepolymer, the preferred ratio of total active-hydrogen containing materials to isocyanate should be such that there is an excess of isocyanate functionality over active-hydrogen functionality. Preferably, the ratio of equivalents of NCO to total active-hydrogen should be between about 1.01:1 to about 2.0:1; preferably between about 1.01:1 to about 1.5:1.

To ensure that the polyurethane-urea intermediate is dispersible in an aqueous media, it is essential that a percentage of the total polymer weight solids, preferably between about 1% and about 10%, is contributed by active-hydrogen containing compositions having the ability to contribute ionic or hydrophilic groups to the polyurethane-urea. For example, diol and/or amines containing carboxylic acid groups, sulfonic acid groups, phosphoric acid groups, ammonium salts, phosphonium salts or sulfonium salts.

The reaction to prepare the prepolymer is typically carried out by charging the active-hydrogen containing composition with the catalyst to a reaction vessel, heating the contents to a temperature of between about 85° C. and about 100° C., and adding, via continuous or stepwise addition over a period of time, preferably between about ½ hour to about 1.5 hours, the isocyanate-functional materials. Optionally present can be a solvent such as n-methyl pyrolidinone, dimethyl formamide, methyl ethyl ketone, toluene, and mixtures thereof in an amount ranging up to about 20% by weight based upon the total weight of the materials present in the reaction vessel. After complete addition of the isocyanate materials, the reaction vessel temperature is maintained between about 90° and 100° C. for approximately 3 to 4.5 hours. Residual isocyanate percentage can be measured by any means well known in the art. The monofunctional active-hydrogen containing composition and/or the modifier composition, if desired, is now added at 80° C. over a 15 minute period. The reaction mixture is held at 90° C. to 100° C. for another ½ to 1.5 hours.

The prepolymer is then poured into water or aqueous medium and dispersed. The water or aqueous medium contains a weak base for neutralizing the acid groups of the prepolymer and a difunctional chain extender.

The difunctional chain extender is selected from the group consisting of difunctional amines such as ethylene diamine, propylene diamine, butylene diamine, hexamethylene diamine, cyclohexylene diamine, piperazine, hydrazine, mixtures thereof, equivalents thereof and the like in an amount sufficient to react with up to about 90% of the theoretical amount of residual NCO functionality. Amounts of chain extender higher than this tend to create dispersions having molecular weights which are unacceptably high. Chain extenders having a functionality greater than two should not be included in any appreciable amount due to their tendency to cause unacceptably high levels of branching.

As stated above, the modifier composition can be added either during the prepolymer cook stage or when the prepolymer is dispersed into water. If added during the prepolymer cook stage, the composition is added to the prepolymer backbone via the active-hydrogen containing reactant. If added when the prepolymer is dispersed in water, the modifier composition is added to the polymer via the chain extender. Either way, the modifier composition, due to the C6-C22 aliphatic chain, adds a large hydrophobic group to the polymer.

The modifier composition is selected from the group consisting of C6-C22 aliphatic chain-containing anhydride-functional fatty acids and oils, C6-C22 aliphatic chain containing epoxidized oils, and mixtures thereof; preferably selected from the group consisting of anhydride-functional linseed oil, soya oil, tung oil, castor oil, sunflower oil and other vegetable oils, anhydride-functional tall oil fatty acid, linseed fatty acid, soya fatty acid, dehydrated castor fatty acid, sunflower fatty acid, epoxidized oils, and mixtures thereof.

The weak base is selected from the group consisting of triethylamine, trimethylamine, triisopropyl amine, tributyl amine, triethylene diamine (e.g. DABCO™, commercially available from Air Products Co.), N,N-dimethyl-cyclohexyl amine, N,N-dimethylstearyl amine, N,N-dimethyl aniline, N-methylmorpholine, N-ethylmorpholine, N-methylpiperazine, N-methylpyrolidine, N-methylpiperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone and mixtures thereof, and dispersed. Most preferred are the tertiary amines as they are not reactive with the free isocyanate groups. The amount of weak base added should be sufficient to neutralize at least about 80% of the ionic groups present in solution. Preferably, the weak base is added in an amount sufficient to neutralize 100% of the ionic groups. The weak base can be added in excess, that is, an amount greater than that necessary to neutralize the ionic groups.

The percentage of solids in the water or aqueous solvent can range from between about 20% by weight to about 60% by weight, preferably between about 30% to 50% by weight.

Preferably, most of the active-hydrogen containing ingredients are either difunctional or monofunctional with respect to isocyanates. A minor amount of the total number of equivalents can be contributed by higher-functional materials; however, an appreciable percentage of such materials is not desired as this results in an intermediate, and thus a final polymer, which exhibits high molecular weight and extensive branching.

The most preferred difunctional active-hydrogen containing starting materials are a combination of 1) the polyester diols formed from the reaction of saturated and unsaturated dihydric alcohols such as ethylene glycol, propylene glycol, neopentyl glycol, 1,4-butanediol, 1,4-butenediol, 1,6-hexanediol, furan dimethanol, and cyclohexane dimethanol with saturated and unsaturated polycarboxylic acids such as maleic acid, fumaric acid, itaconic acid, succinic acid, glutaric acid, adipic acid, isophthalic acid, terephthalic acid, phthalic anhydride, dimethyl terephthalate, dimer acids and the like; and 2) a diol containing hydrophilic groups. One such preferred polyester diol is Rucoflex™ 1015-120 (a mixture of polyester diols based on neopentyl glycol, hexanediol and adipic acid, commercially available from Ruco Polymer Corporation). A particularly preferred diol containing hydrophilic groups is dimethylolpropionic acid. When used, these two diols are preferably present in percentages such that the Rucoflex material contributes between about 40% to about 70% of the OH functionality of the total materials. As the examples below demonstrate, a preferred embodiment comprises Rucoflex 1015-120, trimethylolpropane, dimethylolpropionic acid and cyclohexane dimethanol.

The isocyanate-functional materials are most preferably diisocyanates selected from the group consisting of Desmodur W™ (4,4'-dicyclohexylmethane diisocyanate), m-TMXDI (benzene 1,3-bis (1-isocyanato-1-methylethyl)), IPDI (isophorone diisocyanates) and mixtures thereof. Most preferred is a combination of Desmodur W™ and m-TMXDI.

As with the active-hydrogen containing materials, a minor percentage of the isocyanate-functional materials can have a functionality greater than two, however, for the same reasons, an appreciable percentage of such isocyanate ingredients is not acceptable due to the effect on molecular weight and chain branching of both the intermediate and the final product. When a mixture of two or more isocyanates is used, the ratio of NCO equivalents contributed by the individual isocyanates is not critical.

The dispersing media is preferably water or water based. The amount of dispersing media should be between about 40% and about 80% by weight of total reaction ingredients. More preferably, the percentage of dispersing media is between about 50% and 80% by weight. The amount of diamine chain extension agent used should preferably be sufficient to react with up to about 90% of the residual NCO functionality. The final, chain-extended dis- persion, should have a weight average molecular weight less than about 50,000.

Once dispersed into the dispersing media, the composition can be modified with other standard ingredients commonly used to formulate coatings, penetrating stains, wood preservatives and water sealants. For example, the dispersions of this invention can be combined with other ingredients such as pigments, colorants, paraffins, waxes, UV light stabilizers, rheology modifiers, mildewcides, biocides, fungicides, metal driers and other conventional additives. Colorants and pigment dispersions, when used, are typically added in amounts up to about 15% by volume of the total composition. Paraffin and ethylene waxes, used to impart water resistance to such finishes, when used, are typically added in amounts up to about 2–3% by weight of the total composition.

In one embodiment of this invention, a surface tension modifying ingredient can be added to the composition to lower the surface tension of the carrier. It has been found that such a surface tension modifying ingredient can enable the composition to more easily penetrate into the porous substrate to which it is applied. Suitable solvents for use as surface tension modifying ingredients include the 2,2,4-trimethyl-alkyl diol monoisobutyrate solvents available from Eastman Chemical marketed under the Texanol™ brand name, glycols such as ethylene glycol, propylene glycol, dipropylene glycol, and the like, glycol ethers such as 2-butoxy ethanol (Butyl Cellosolve™), diethylene glycol monobutyl ether (Butyl Carbitol), and the like, and alcohols such as methanol, ethanol, propanol and the like; and mixtures thereof. Generally, the surface tension modifying agent should be included in an amount sufficient to lower the surface tension of the carrier to a level where the composition will achieve the desired penetration into the porous substrate. Typically, the amount of surface tension modifying agent required is from between about 0.25% to about 5.0% by volume based upon the total volume of the composition. However, it should be appreciated that many standard stain and sealant additives are commercially available in a media which imparts some surface tension modifying activity. In particular, it should be appreciated that many commercially available rheology modifiers are sold in glycol and glycol ether media. The media may contribute some surface tension modifying properties. For example, the Rheolate™ materials are commercially available in a butyl carbitol media. Additionally, some mildewcides and fungicides are commercially available in petroleum distillate media. These media additionally may impart some surface tension modifying characteristics. In general, media which would be expected to impart surface tension modifying activity and which are present in an appreciable amount should be included when calculating the total percentage of surface tension modifying agents.

The following examples demonstrate acceptable methods of preparation of the compositions of this invention. The examples are intended to be representative of the formulations which can be made and are not intended to limit the scope of the invention.

EXAMPLE I

Preparation of the Dispersion

Charge 40.0 g of n-methyl pyrolidinone, 248.28 g of Rucoflex 1015-120 (0.54 eq of OH), 30.78 g of dimethylolpropionic acid (0.46 eq of OH), 7.5 g of trimethylolpropane (0.166 eq of OH), 10.0 g of 1,4-cyclohexane dimethanol (0.138 eq of OH) and 2.0 g of dibutyl tin dilaurate (10% solution in n-methyl pyrolidinone) to a reaction vessel equipped with a nitrogen blanket. Begin stirring and increase temperature to about 90° C. Begin a 30–40 minute addition of 255.2 g of benzene-1,3-bis(1-isocyanato-1-methylethyl) (2.09 eq of NCO). After addition of all isocyanate-functional materials, hold the reaction at 90° C. for approximately 4.0 hours. Disperse in 1356.4 g of water containing 20.8 g of triethylamine to neutralize the ionic groups and quickly add 22.45 g of ethylene diamine chain extender, 15.0 g of Butyl Cellosolve (butoxy ethanol) and 251.79 g of anhydride-functional oil (Aquamac 1610 commercially available from McWhorter) and hold the reaction for another 45 minutes.

EXAMPLE II

Wood Stain

The following represents a typical semi-transparent stain composition using the polyurethane dispersion of Example I to which standard commercially available tinting colorants and pigment dispersions may be added.

| | | |
|---|---:|---|
| Water | 216.00 | g |
| Dispersion of Example I | 297.00 | |
| Defoamer | 1.00 | |
| Water | 157.90 | |
| Min-u-gel 400 Attapulgite Clay | 6.70 | |
| Triton CF-10 Surfactant N-332 | 2.00 | |
| Tinuvin UV Absorber 1130 | 3.20 | |
| Tinuvin 292 | 2.11 | |
| Polyphase P-20T | 21.50 | |
| Minex 4 nepheline syenite | 14.7 | |
| Water | 8.31 | |
| Michemlube 511 Wax | 5.90 | |
| Water | 83.10 | |
| Proxcel Biocide | 0.40 | |
| Water | 44.2 | |
| | 845.77 | g |

What is claimed is:

1. A composition comprising a dispersion of a polyurethane-urea in an aqueous media having a particle size diameter of less than about 0.4 micron; wherein the polyurethane-urea dispersion is obtained by dispersing, in the presence of a weak base, an isocyanate functional prepolymer into water and admixing a diamine chain extender, wherein the prepolymer is formed by reacting in the presence of a catalyst:
   (i) an active-hydrogen containing composition containing at least two active hydrogen groups per molecule:
   (ii) an isocyanate-functional material; and
   (iii) a modifier composition selected from the group consisting of C6–C22 aliphatic chain-containing anhydride-functional fatty acids and oils, and mixtures thereof,
wherein the ratio of (i) to (ii) in said prepolymer is such that the ratio of isocyanate functionality to total active-hydrogen functionality is in the range of between about 1.01:1 to about 2.0:1; and wherein between about 1% and about 10% of the total polymer weight solids of the polyurethane-urea is contributed by active-hydrogen containing compositions having ionic or hydrophilic groups which are contributed to the polyurethane-urea; and wherein said modifier composition becomes chemically attached to the polyurethane-urea via the reaction between the anhydride functional groups of said modifier composition and the active hydrogen groups of said active-hydrogen containing composition during the reaction to form said prepolymer.

2. The composition of claim 1 wherein the modifier composition is selected from the group consisting of anhydride-functional linseed oil, soya oil, tung oil, castor oil, sunflower oil, and other vegetable oils, anhydride-functional tall oil fatty acid, linseed fatty acid, soya fatty acid, dehydrated castor fatty acid, sunflower fatty acid, and mixtures thereof.

3. The composition of claim 1 wherein the isocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanate, 4,4'-dicyclohexylmethane diisocyanate, benzene 1,3-bis(1-isocyanato-1-methylethyl), and mixtures thereof.

4. The composition of claim 1 wherein the catalyst is selected from the group consisting of di-butyl tin dilaurate, tin octoate and mixtures thereof.

5. The composition of claim 1 wherein between about 1% and about 10% by weight of the total polymer weight solids is contributed by diols and/or amines having ionic or hydrophilic groups which are contributed to the polyurethane-urea.

6. The composition of claim 5 wherein said diol and/or amines contain carboxylic acid groups, sulfonic acid groups, phosphoric acid groups, ammonium salts, phosphonium salts or sulfonium salts.

7. The composition of claim 1 wherein the diamine chain extender is present in an amount sufficient to react with up to about 90% of the theoretical amount of residual NCO functionality.

8. The composition of claim 1 wherein the isocyanate-functional prepolymer further comprises an active-hydrogen containing composition that is monofunctional with respect to isocyanates and which contains an aliphatic chain having at least six carbons.

9. The composition of claim 8 wherein from about 1% to about 50% of the total active hydrogen functionality of the prepolymer is contributed by the monofunctional composition.

10. The composition of claim 9 wherein the monofunctional composition is selected from the group consisting of hexyl, soya, tallow, hydrogenated tallow, stearyl, coco, lauryl, and oleyl alcohol, mercaptan, amine and mixtures thereof.

11. A composition comprising a dispersion of a polyurethane-urea in an aqueous media having a particle size diameter of less than about 0.4 micron; wherein the polyurethane-urea dispersion is obtained by dispersing, in the presence of a weak base, an isocyanate functional prepolymer into water and chain extending said prepolymer by admixing a (a) diamine chain extender and (b) a modifier composition selected from the group consisting of C6–C22 aliphatic chain-containing anhydride-functional fatty acids and oils, and mixtures thereof; wherein the prepolymer is obtained by reacting in the presence of a catalyst:

(i) an active-hydrogen containing composition containing at least two active hydrogen groups per molecule;

(ii) an isocyanate-functional material; and wherein the ratio of (i) to (ii) in said prepolymer is such that the ratio of isocyanate functionality to total active-hydrogen functionality is in the range of between about 1.01:1 to about 2.0:1; and wherein between about 1% and about 10% of the total polymer weight solids of the polyurethane-urea is contributed by active-hydrogen containing compositions having ionic or hydrophilic groups which are contributed to the polyurethane-urea; and wherein said modifier composition becomes chemically attached to the polyurethane-urea via the reaction between the anhydride functional groups of said modifier composition and the amine groups of said diamine chain extender when said prepolymer is chain extended.

12. The composition of claim 11 wherein the modifier composition is selected from the group consisting of anhydride-functional linseed oil, soya oil, tung oil, castor oil, sunflower oil, and other vegetable oils, anhydride-functional tall oil fatty acid, linseed fatty acid, soya fatty acid, dehydrated castor fatty acid, sunflower fatty acid, and mixtures thereof.

13. The composition of claim 11 wherein the isocyanate-functional material is selected from the group consisting of tetramethylene diisocyanate, hexamethylene diisocyanate, 2,4-toluene diisocyanate, 2,6-toluene diisocyanate, 4,4'-diphenylmethane diisocyanate, isophorone diisocyanate, 4,4'-dicyclohexylmethane diisocyanate, benzene 1,3-bis(1-isocyanato-1-methylethyl), and mixtures thereof.

14. The composition of claim 11 wherein the catalyst is selected from the group consisting of di-butyl tin dilaurate, tin octoate and mixtures thereof.

15. The composition of claim 11 wherein between about 1% and about 10% by weight of the total polymer weight solids is contributed by diols and/or amines having ionic or hydrophilic groups which are contributed to the polyurethane-urea.

16. The composition of claim 15 wherein said diol and/or amines contain carboxylic acid groups, sulfonic acid groups, phosphoric acid groups, ammonium salts, phosphonium salts or sulfonium salts.

17. The composition of claim 11 wherein the diamine chain extender is present in an amount sufficient to react with up to about 90% of the theoretical amount of the residual NCO functionality.

18. The composition of claim 11 wherein the isocyanate-functional prepolymer further comprises an active-hydrogen containing composition that is monofunctional with respect to isocyanates and which contains an aliphatic chain having at least six carbons.

19. The composition of claim 18 wherein from about 1% to about 50% of the total active hydrogen functionality of the prepolymer is contributed by the monofunctional composition.

20. The composition of claim 19 wherein the monofunctional composition is selected from the group consisting of hexyl, soya, tallow, hydrogenated tallow, stearyl, coco, lauryl, and oleyl alcohol, mercaptan, amine and mixtures thereof.

* * * * *